United States Patent [19]

Gentry et al.

[11] Patent Number: 5,460,585
[45] Date of Patent: Oct. 24, 1995

[54] MUSCLE TRAINING AND PHYSICAL REHABILITATION MACHINE USING ELECTRO-RHEOLOGICAL MAGNETIC FLUID

[75] Inventors: Scott B. Gentry, Romeo; Joseph F. Mazur, Washington; Brian K. Blackburn, Rochester, all of Mich.

[73] Assignee: B.G.M. Engineering, Inc., Romeo, Mich.

[21] Appl. No.: 212,493

[22] Filed: Mar. 11, 1994

[51] Int. Cl.$^6$ .......................... A63B 21/005; A63B 71/00
[52] U.S. Cl. ..................... 482/1; 482/5; 482/903
[58] Field of Search .................. 482/1–10, 903, 482/57, 63, 70, 71, 72, 73, 111–113

[56] References Cited

U.S. PATENT DOCUMENTS

| | | |
|---|---|---|
| 4,869,476 | 9/1989 | Shtarkman . |
| 4,896,752 | 1/1990 | Shtarkman . |
| 4,896,754 | 1/1990 | Carlson et al. . |
| 4,942,947 | 7/1990 | Shtarkman . |
| 4,986,533 | 1/1991 | Lo . |
| 4,992,190 | 2/1991 | Shtarkman . |
| 5,012,740 | 5/1991 | Hardt . |
| 5,014,981 | 5/1991 | Prelich . |
| 5,015,926 | 5/1991 | Casler ........................ 482/903 |
| 5,029,823 | 7/1991 | Hodgson et al. . |
| 5,050,850 | 9/1991 | Noguchi et al. . |
| 5,051,638 | 9/1991 | Pyles . |
| 5,070,816 | 12/1991 | Wehrell . |
| 5,072,930 | 12/1991 | Sun . |
| 5,076,573 | 12/1991 | Lo . |
| 5,088,703 | 2/1992 | Takano et al. . |
| 5,099,884 | 3/1992 | Monahan . |
| 5,145,480 | 9/1992 | Wang . |
| 5,167,850 | 12/1992 | Shtarkman . |
| 5,170,866 | 12/1992 | Ghaem . |
| 5,176,368 | 1/1993 | Shtarkman . |
| 5,180,145 | 1/1993 | Watanabe et al. . |
| 5,194,059 | 3/1993 | Wu . |
| 5,195,267 | 3/1993 | Daniels ........................ 43/18.1 |
| 5,195,618 | 3/1993 | Wu . |
| 5,201,772 | 4/1993 | Maxwell .................... 482/903 |
| 5,277,281 | 1/1994 | Carlson et al. . |
| 5,284,330 | 2/1994 | Carlson et al. . |
| 5,306,216 | 4/1994 | Kato et al. ................. 482/903 |
| 5,354,488 | 10/1994 | Shtarkman et al. . |

OTHER PUBLICATIONS

Popular Science, Automotive, Suspension, Magnetic Shocks, Jun. 1994 p. 40.
"Active damping using ERM fluids", Automotive Engineering Magazine, Jun. 1993, pp. 19–23.
"An Actively Damped Passenger Car Suspension System with Low Voltage Electro–Rheological Magnetic Fluid", SAE Technical Paper Series, 930268, Mar. 1993.
"ER fluid engine mounts", Automotive Engineering Magazine, Feb. 1993, pp. 52–55.

Primary Examiner—Stephen R. Crow
Attorney, Agent, or Firm—Basile and Hanlon

[57] ABSTRACT

A force development system for controlling and generating variable shear forces in an exercise machine is disclosed for strengthening and developing body muscles during weight training or physical rehabilitation therapy. In the force development system, first and second members are movable with respect to one another and define an interspacial chamber therebetween. The interspacial chamber is filled with an electro-rheological magnetic fluid for selectively changing the shear stress characteristics in response to an applied magnetic field and for requiring a corresponding amount of force to move one of the first and second members with respect to the other of the first and second members. A magnetic field inducing mechanism is provided for selectively exposing the electro-rheological magnetic fluid means to a magnetic field of controlled intensity to selectively change the shear stress characteristics of the electro-rheological magnetic fluid.

20 Claims, 5 Drawing Sheets

MUSCLE TRAINING AND PHYSICAL REHABILITATION MACHINE USING ELECTRO-RHEOLOGICAL MAGNETIC FLUID

FIELD OF THE INVENTION

The present invention relates to physical exercise machines and devices, such as those used in weight training and physical rehabilitation therapy, and more particularly, the invention relates to an electronically controlled force production and force control mechanism using electro-rheological magnetic fluid for use with numerous types of configurations of exercise machines.

BACKGROUND OF THE INVENTION

The distinct characteristic of rheological fluids is that, when exposed to the appropriate energy field, solid particles in the fluid align. When this alignment occurs, the ability of the fluid to flow, or shear, is substantially reduced. Two types of rheological fluids have been developed. Each is based on different applied energy fields. One fluid type is responsive to a voltage field, while the other is rheological to a magnetic field. Electro-rheological (ER) fluids, i.e., those that are responsive to a high-voltage, low-current electric field, have been extensively investigated. Some application restrictions are that the ER fluids require thousands of volts for operation, and yield low shear stresses. Safety and packaging are also design problems. On the other hand, electro-rheological magnetic (ERM) fluid, which is responsive to a magnetic field, operates on battery voltage and generates high fluid shear stress. The value of ERM fluid shear stresses developed are extremely high in comparison to ER fluid. ERM fluid has been used in automotive applications, such as shock absorbers, clutches, engine mounts and active bushings. ERM fluid typically includes a magnetizable particulate, fibrous carbon and a carrier vehicle. An example of a solid magnetizable particle is carbonyl iron. Other ferrometallic particulates and compounds may also be used. The carrying vehicle can be silicone oil. The fluid may also contain a surfactant to keep the solid particles in suspension. The application requirements for magnetic field-responsive fluids include very low shear resistance at zero field, high shear stresses at maximum applied field, very low hysteresis, chemical inertness, temperature stability and fast response time.

Conventional exercise machines typically use the force of gravity acting on a stack of weights to apply a resistance force to the movement of a body part to strengthen the muscles controlling such part. The user selects the number of weights desired for stressing the muscle involved in the movement of the body part in question. Alternatively, weights may be supported at variable distances along a force beam so that the resistance force applied to the user's body part is increased by the distance at which the weight is positioned from the pivot point of the force beam. Also, resistance to movement force is often varied during certain ranges of the exercise motion by using a cam to vary the effective weight of a weight stack or the length of a force movement arm of the device. The greatest deficiencies of this type of conventional exercise machine is that it is subject to the effects of gravity, friction and inertia. The combination of these three forces cause the actual user-experienced force to be less than predictable except within very limited performance parameters. Similar difficulties are encountered when the weights are replaced with elastic members or by fluid resistance or force-type components, such as air flow fans or hydraulic pistons or motors. None of the conventional exercise machines have the ability to substantially increase or decrease the selected applied force other than by a slight variation caused by the changing leverages resulting from changes in the structural configuration relating one part of the exercise machine to another. None of the conventional machines offers an accurate predictable force at varied exercise speeds and few have the ability to offer a controlled resistance in both directions of the exercise stroke, such as muscle extension followed by muscle retraction or contraction.

Several electronically controlled exercise machines are known where forces are created by an electromagnetic braking system, a hydraulic force system, a pneumatics force system or a direct current motor used as a dynamic brake. The electromagnetic braking systems target the weakest force generated by a muscle and consequently the results from the exercise machine are limited to the relatively low force resistance of the muscles. The air hydraulics or pneumatics system and the fluid hydraulics system of applying resistive forces in exercise machines have been used by several manufacturers. These machines allow resistance in both directions of the exercise stroke. These types of exercise machines use air or fluid pressure and mechanical linkages or leverage systems to provide the resistance forces against which exercise forces are applied by the user. Both systems are quite expensive to produce and their overall speed and force potential are not controllable to the extent desired. Further, these systems are often large and bulky and have a potential for fluid leaks, having bubbles form in the fluid channels, and require systematic maintenance to assure correct operation. A direct current motor has recently been used as a dynamic braking device in exercise machines. This method of producing a resistance force is rather basic and is not easily adaptable to even simple force curves. Further, exercise machines with dynamic braking devices having a problem with inertia and thereby may be less safe in operation. Inertia also reduces response time to electric commands from the control system and consequently reduces the performance of the mechanism.

SUMMARY OF THE INVENTION

The present invention seeks to address the shortcomings of the previously-known exercise machines by providing a force development system for controlling and generating variable shear forces in exercise machines used to strengthen and develop body muscles or in physical rehabilitation therapy. In its simplest form, the present invention includes first and second members moveable with respect to one another. The first and second members define an interspacial chamber between the first and second members. Electro-rheological magnetic fluid means is disposed within the chamber for selectively changing shear stress characteristics in response to an applied magnetic field of controlled intensity. The electro-rheological magnetic fluid means requires a predefined variable amount of force to move one of the first and second members with respect to the other of the first and second members correlating to the intensity of the applied magnetic field. Magnetic field inducing means is provided for selectively exposing the electro-rheological magnetic fluid means to a magnetic field of controlled intensity. It is anticipated that the present invention can be adapted for electro-rheological magnetic fluid based resistance mechanisms for application in aerobic rowing machines, skiing machines, bikes, weight training machines, physical therapy and rehabilitation machines or the like. The connection between the force development system of the present invention and the user-engaged portions of the exercise machine are considered conventional and well known structure for the particular type of exercise machine desired.

Electro-rheological magnetic (ERM) fluid is a compound that responds to magnetic energy fields becoming more or less viscous depending on the strength of the field being applied. When the magnetic field is increased, suspended ferrous particles in the fluid align with the magnetic lines of force creating increased resistance. When the magnetic field is decreased, the fluid becomes more liquid and resistance is reduced instantaneously. The ERM fluid system can be electronically controlled by circuit modulation techniques including direct control from a microprocessor. When a step function of torque is required, the system is capable of response within one-tenth of a second. The ERM resistive brake of the present invention requires approximately 1 amp of current and can operate on 12 volts of direct current from a low-cost wall transformer. The required current depends on the maximum required torque which can be modulated over a complete specified linear range allowing an infinite amount of torque adjustment. The ERM fluid system reduces the requirements for correlating mechanical mechanisms and is capable of delivering excellent torque performance in a very small volume container. The output shaft can be directly coupled to the ERM fluid brake, further reducing complexity, overall equipment size and cost. The ERM fluid-based resistance mechanism for exercise machines according to the present invention is fully programmable, compact, responsive, light-weight, cost-effective, and can be uni-directional or bi-directional. The present invention is continuously adjustable for the desired resistance force throughout the length of the exercise stroke and in either direction, extension or contraction.

The first and second members of the present invention can take a variety of structural configurations. The preferred configuration of the present invention is a rotatable disc fixedly carried on a shaft having an axis of rotation and a housing enclosing the disc and supporting the shaft and disc for rotation. The housing and disc are spaced slightly longitudinally and radially from one another to define an interspacial chamber therebetween. The shaft has at least one end extending outwardly from the housing for operable connection to an exercise machine. Depending on the torque requirements of the particular application, the diameter and longitudinal width of the rotatable disc may be modified to provide the appropriate amount of surface area and moment arm to generate the required torque characteristics. In addition, the surface area of the disc and/or the housing may be roughened, such as by knurling to increase the effective surface area.

An electro-rheological magnetic (ERM) fluid, responsive to a magnetic field, and capable of operating on low voltage to generate changes in shear stress characteristics is disposed within the interspacial chamber between the rotatable disc and the housing. The ERM fluid typically includes a magnetizable particulate and a carrier vehicle for suspending the magnetizable particulate. The ERM fluid may also include a surfactant for keeping the magnetizable particulate in suspension. The ERM fluid used in the present invention has a low shear resistance at zero magnetic field, a high shear resistance at a maximum applied magnetic field, low hysteresis, chemical inertness, temperature stability and a fast response time to changes in the applied magnetic field. The term low hysteresis as used in the present invention is defined as a lag of effect when the forces acting on a body are changed, such as a lag in magnetization (magnetic hysteresis) of a ferromagnetic substance when the magnetizing force is changed. Suitable ERM fluids are disclosed in U.S. Pat. Nos. 4,992,190 and 5,167,850 which are incorporated by reference herein.

The magnetic field inducing means of the present invention preferably includes at least one coil of electrically conductive wire supported by one of the first and second members in close proximity to the chamber. The coil of wire has first and second ends connectible to a controlled electrical power source. In one form of the invention, the coil of electrically conductive wire may be wound helically around the external surface of the housing extending longitudinally along the axis of rotation of the shaft carrying the rotatable disc within the housing. In addition or alternatively, the coil of electrically conductive wire may be wound spirally to extend radially with respect to the axis of rotation along a radially extending wall of the housing, or along the radially extending walls of the housing, e.g. on either side or on both sides of the rotatable disc. In the preferred configuration of the present invention, the coil of electrically conductive wire includes a plurality of coil assemblies defined by a plurality of bobbins for receiving wound coils of electrically conductive wire. The coil assemblies are electrically connected together and supported by at least one of the first and second members in close proximity to the chamber. The plurality of coils are connected to a controlled electrical power source. Preferably, the plurality of coils are connected in series with one another and are disposed along the longitudinally extending surface of the housing at the radial outer end of the rotatable disc. In the alternative, or additionally, a plurality of coils of electrically conductive wire may be electrically connected together and supported on at least one of the radially extending walls of the housing. Depending on the operating requirements of the particular application, the diameter or gauge of the wire may be varied, the number of turns of wire around the housing and/or bobbins attached to the housing may be varied and the amperage may be varied as required to achieve the desired torque characteristics.

The present invention creates, controls and transmits a precise and adjustable applied or resistive force that can substantially increase the muscle development results from an exercise due to the mechanism's ability of controlling variable resistance to movement in one or both directions of an exercise stroke or repetition relating to the body area or muscles being exercised. Thus, the mechanism of the invention can be used to provide an improved system for controlling variable resistive force in exercise machines, physical therapy and rehabilitation machines or the like.

It is desirable in the present invention to provide a force development system capable of precise control to allow improved performance parameters in the creation and control of force used in exercise machines or machines for physical rehabilitation therapy. The force development system of the present invention responds to electronic input to generate the desired force for the user. The force development system of the present invention is electronically sensitive and responds in a matter of milliseconds to electrical or microprocessor commands. If desired, motion and force information can be monitored by a closed loop electronic sensing unit that receives input information from an output drive shaft or this information can be derived by means of the control system. A microprocessor can send commands to the force development system as directed by a software program stored in memory in the electronic control unit.

Improved muscle development results can be derived from the present invention due to the ability of the mechanism to adapt more advanced physiological principles into an exercise program. Such principles or capabilities are possible due to the fact that the present invention has the required sensitivity, force response and control capabilities. The present invention allows for true isotonic capability (where repetitions are performed against controlled preset forces and the speed varies according to how much additional force is applied by the user), true isokinetic capability (where the maximum speed of the repetitions is controlled regardless of the force applied), isotonic/isokinetic capabilities (where minimum preset forces must be overcome to initiate and complete each repetition and where the maximum speed of the repetition is preset), concentric/eccentric capabilities (where the force development system of the present invention allows concentric motions of muscles shortening and eccentric motions of muscle lengthening depending on the structure and configuration of the exercise device to which the force development system of the present invention is installed) and isotonic concentric/isokinetic eccentric capabilities (where the muscle shortening can be performed against a controlled force, while the muscle lengthening is performed at a controlled speed).

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED AND ALTERNATIVE EMBODIMENTS

Figure 2:
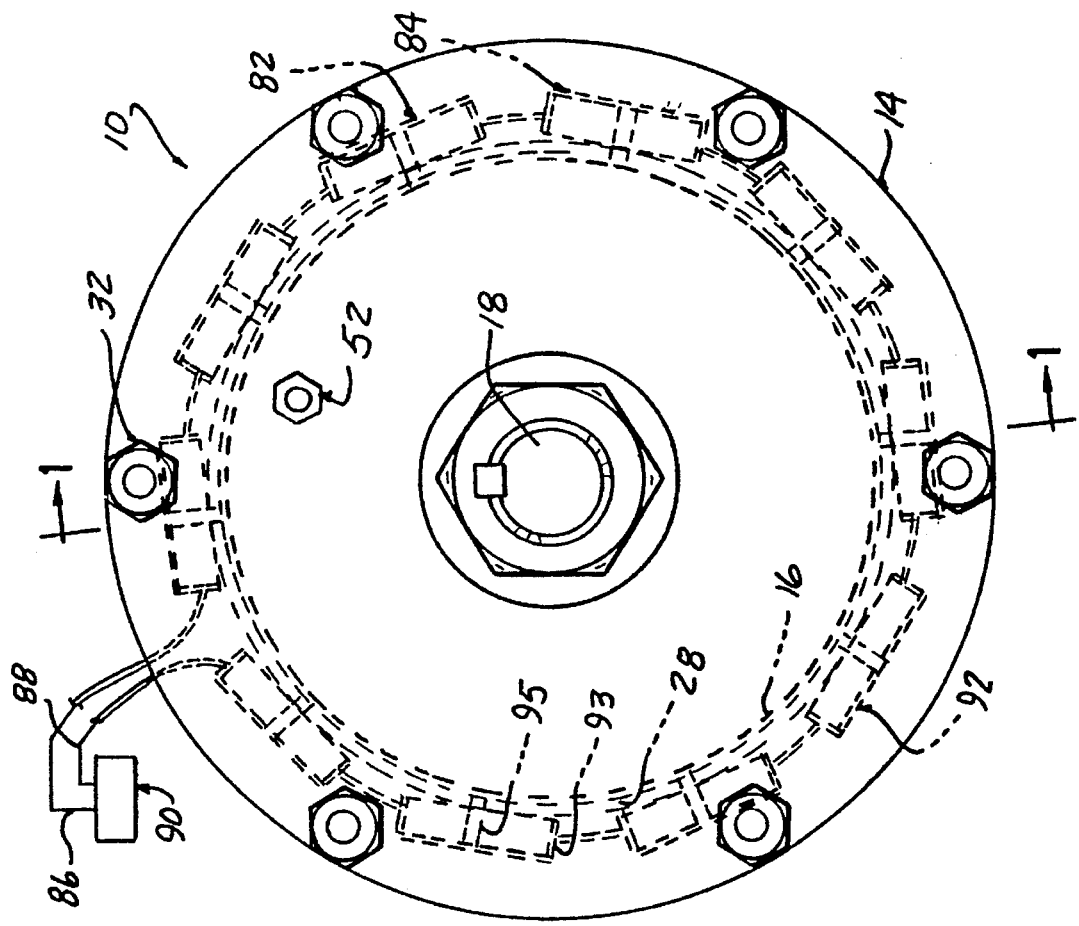
FIG. 2 is a side view of the force development system according to the present invention as illustrated in FIG. 1.
Figure 1:
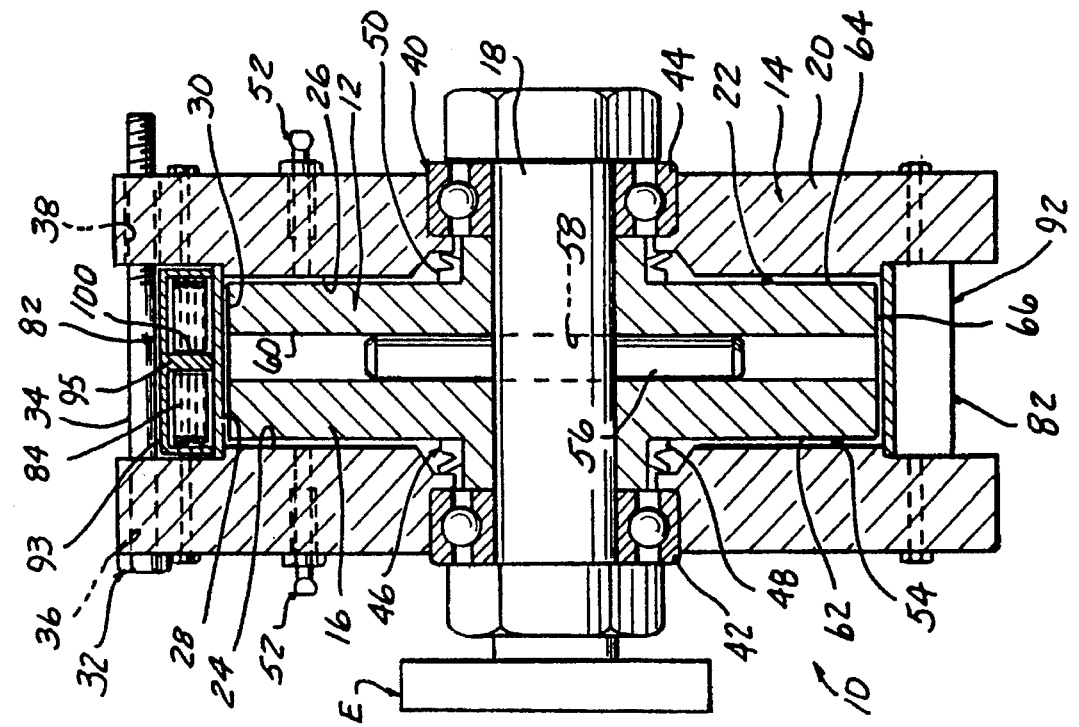
FIG. 1 is a cross-sectional view of a force development system for controlling and generating variable shear forces in exercise machines used to strengthen and develop body muscles according to the present invention.
Figure 3:
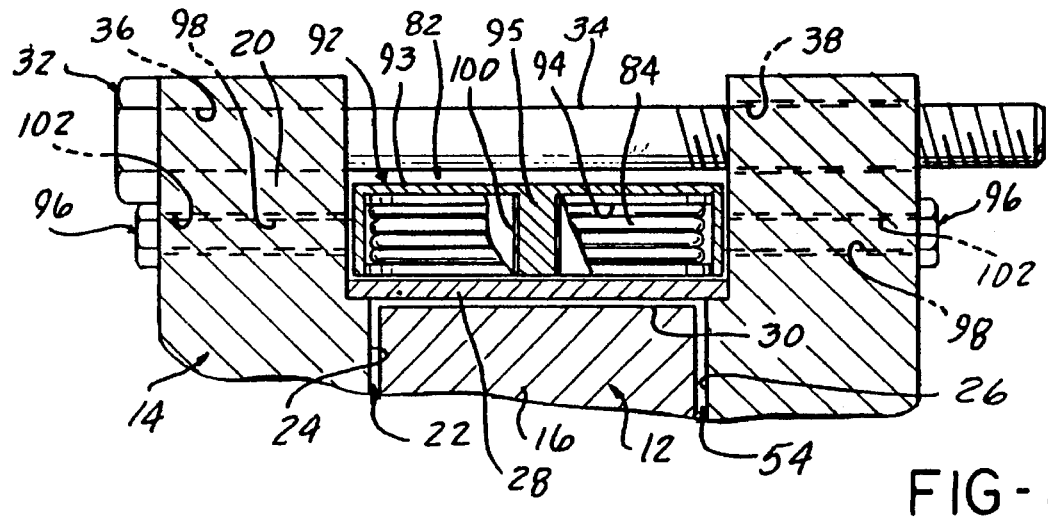
FIG. 3 is a detailed view of a magnetic field inducing means according to the present invention as illustrated in FIG. 1.

A force development system 10 for controlling and generating variable shear forces in an exercise machine used to strengthen and develop body muscles is illustrated in its preferred configuration in FIGS. 1–3. According to the present invention, the force development system 10 in its simplest form includes first and second members, 12 and 14 respectively, moveable with respect to one another. The first and second members, 12 and 14 respectively, define an interspacial chamber therebetween. In the preferred configuration, the first and second members, 12 and 14 respectively, can include a rotatable drum or disc 16 secured to and carried on a shaft 18 having an axis of rotation. A housing 20 encloses the disc 16 and supports the shaft 18 and disc 16 for rotation within the housing 20. The housing 20 and disc 16 are spaced slightly longitudinally and radially from one another to define an interspacial chamber 22. The interspacial chamber 22 extends radially outwardly between the rotatable disc 16 and the first and second radially extending sidewalls, 24 and 26 respectively, of the housing 20 and along a longitudinally extending portion of the chamber 22 defined between the third longitudinally extending sidewall 28 of the housing 20 and the outer radial end 30 of the rotatable disc 16.

The third sidewall 28 is preferably in the form of a longitudinally extending cylinder having a longitudinal length slightly greater than the longitudinal width of the rotatable disc 16 as best seen in FIG. 3. The third sidewall 28 can be disposed between first and second sidewalls, 24 and 26 respectively, of the housing 20. The first and second sidewalls, 24 and 26, are fastened together by suitable securing means 32 such as bolt 34 passing through aperture 36 extending longitudinally through first sidewall 24 and threaded aperture 38 coaxially aligned with aperture 36 and longitudinally extending through second sidewall 26 to clampingly engage the third sidewall 28 therebetween in a fluid tight manner. If required, first seal means (not shown) may be provided between the third sidewall 28 and first and second sidewalls 24 and 26 to provide a fluid tight connection. Housing 20 supports shaft 18 for rotation with respect thereto by bearing means 40, such as first and second roller bearings, 42 and 44 respectively, disposed within first and second sidewalls, 24 and 26 respectively. Chamber 22 is isolated from bearing means 40 and shaft 18 by suitable second seal means 46, such as annular seal rings 48 and 50 disposed between the rotatable disc 16 and the first and second sidewalls, 24 and 26 respectively. Normally-closed, fluid entry means 52 can be provided in one or both of the first and second sidewalls, 24 and 26, to allow chamber 22 to be filled with the ERM fluid means 54. The ERM fluid means 54 entirely fills the void or interspacial chamber 22 defined between the first, second and third sidewalls of the housing, 24, 26 and 28 respectively, and the rotatable disc 16. Preferably, the distance between the rotating disc 16 and the immediately adjacent sidewall, either the first sidewall 24, second sidewall 26 or third sidewall 28, is relatively small, e.g. on the order of 0.02 inches. Preferably, the housing 20 is made of nonmagnetic material, such as aluminum.

The rotatable disc 16 is connected to the shaft 18 for rotation therewith. This connection between the rotatable disc 16 and shaft 18 may be accomplished by any suitable means and is considered to be within the ordinary skill of the art. The rotatable disc 16 may be integrally formed with the shaft 18, or may be connected by a keyway joint or by a radially extending roll pin connection 56 passing through a diametrically extending aperture 58 extending through the shaft 18 coaxially aligned with a second diametrically extending aperture 60 extending through rotatable disc 16 as best seen in FIG. 1.

Figure 9:
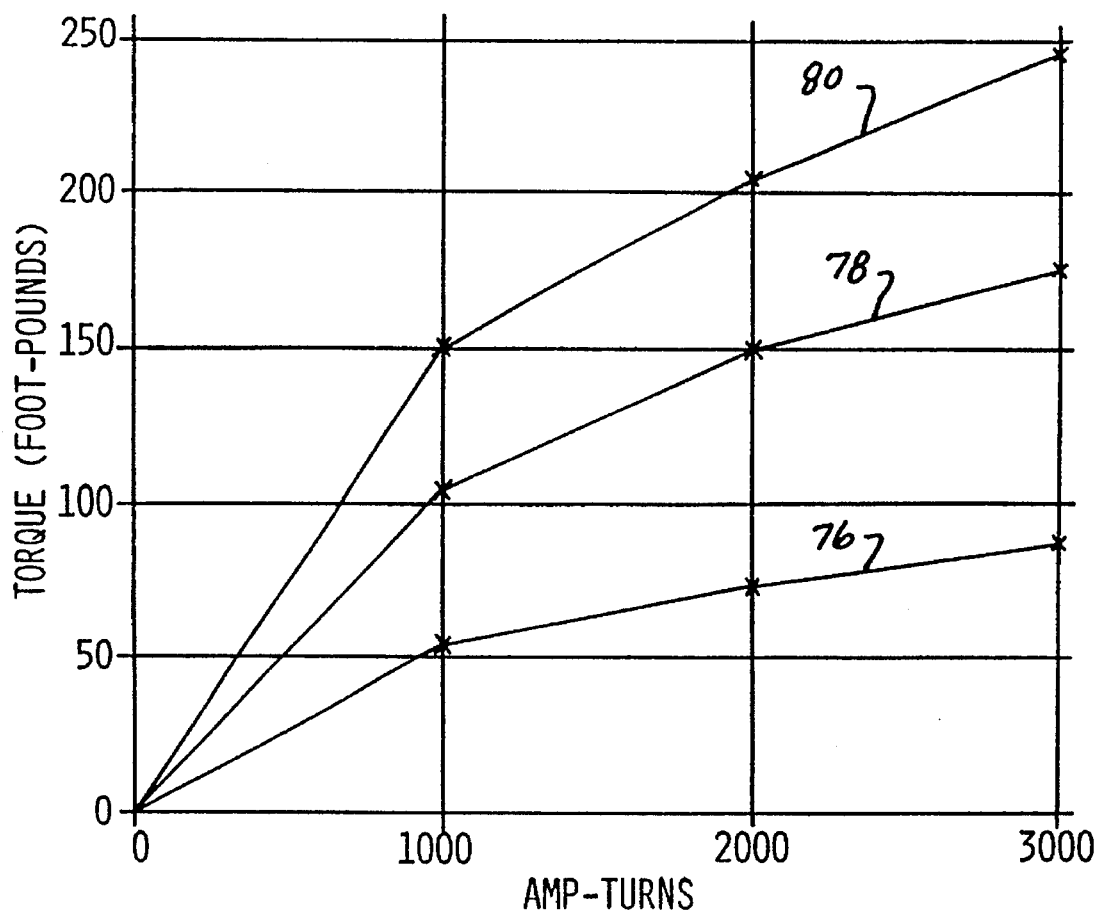
FIG. 9 is a graph of the fluid shear stress in torque (foot-pounds) versus amp-turns for a rotatable disc having a radius of approximately 5 inches and a width of approximately 1.5 inches according to the present invention.
Figure 11:
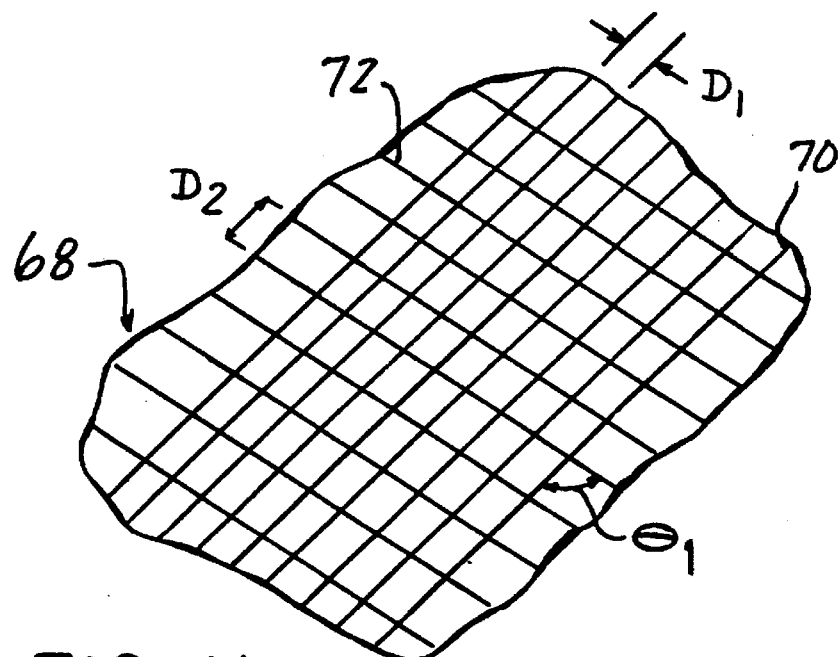
FIG. 11 is a simplified schematic plan view of a knurled surface according to the present invention.
Figure 12:
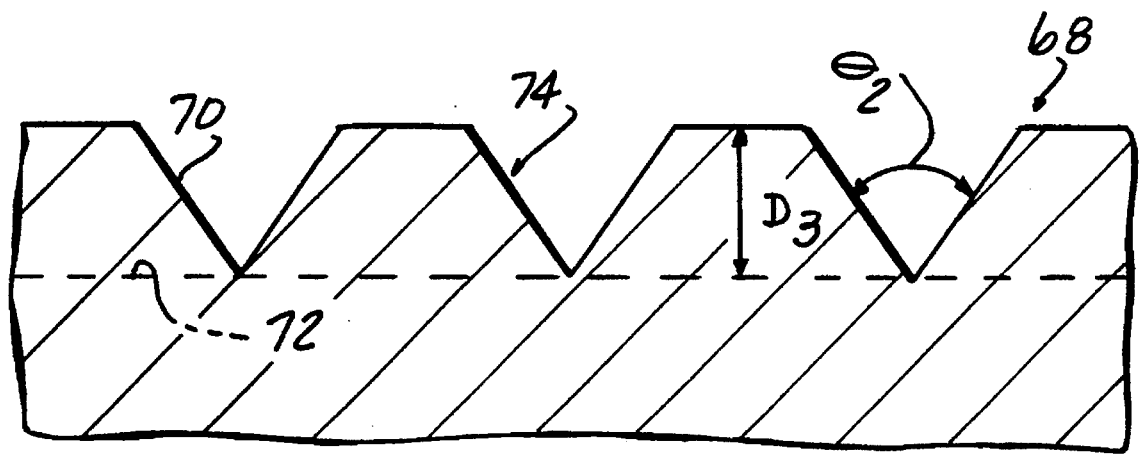
FIG. 12 is a simplified cross-sectional detail of the knurled surface shown in FIG. 11.

One or more of the external surfaces of the rotatable disc 16, first radially extending disc sidewall 62, second radially extending disc sidewall 64 and/or third, longitudinally extending, disc sidewall 66, may include roughened surface means 68 for increasing the effective surface area of contact between the ERM fluid means 54 and the external surface of the rotatable disc 16. Alternatively, or in addition, the first, second and third sidewalls, 24, 26 and 28 respectively, of the housing 20 may also include roughened surface means 68. The roughened surface means 68 can take the form of a knurled surface as illustrated in FIGS. 11 and 12. The knurled surface preferably is cut in a rectangular or diamond pattern of a first set of parallelly extending grooves 70 intersecting a second set of parallelly extending grooves 72 at a predetermined angle $\Theta_1$. The first set of parallelly extending grooves 70 are spaced at a distance $D_1$ from one another and the second set of parallelly extending grooves 72 are spaced at a distance $D_2$ from one another. The grooves preferably are V-shaped and defined by an angle $\Theta_2$ between the two sidewalls of the V-shaped groove 74 and cut into the desired surface a depth $D_3$. Preferably, each of the grooves in the first and second set of grooves, 70 and 72 respectively, has a similar angle $\Theta_2$ preferably approximately 60° and a depth $D_3$ of cut of preferably 0.02 inches. It should be recognized that the pattern and cross-sectional configuration of the grooves, and/or the angle $\Theta_2$ and depth $D_3$ of the grooves can be varied as desired to achieve the effective wetted surface area required. The roughened surface means 68 can be provided on a rotatable disc 16 of predefined fixed dimensions in order to change the operating characteristics as illustrated in the graph of FIG. 9. The lowermost torque curve 76 of that graph illustrating a rotatable disc 16 and housing 20 having plain surfaces without any roughened areas, such as a knurled surface. The intermediate torque curve 78 illustrating a rotatable disc 16 having a knurled surface of sufficient configuration to double the effective wetted surface area. The upper torque curve 80 of the graph in FIG. 9 illustrating the operating characteristics available when all three disc sidewalls and all three housing sidewalls are roughened with knurled surfaces to effectively produce approximately four times the effective wetted surface area as compared to the plain surfaces of the rotatable disc 16 and housing 20. The rotatable disc 16 and housing 20 according to the present invention used in producing the torque curves as illustrated in FIG. 9 included a disc of approximately 5 inches in diameter and a longitudinal length or width of approximately 1.5 inches, where the sidewall of the housing is spaced approximately 0.02 inches from each of the sidewalls of the rotatable disc 16.

Referring again to FIGS. 1–3, the ERM fluid means 54 is a compound that responds to a magnetic energy field by becoming more or less viscous depending on the strength of the magnetic field being applied. When the magnetic field is increased, suspended ferrous particles in the fluid align with the electromagnetic lines of force creating increased resistance. When the magnetic field is decreased, the fluid becomes more liquid and resistance is reduced instantaneously. The ERM fluid means 54 is responsive to a magnetic field and capable of operating on low voltage to generate changes in shear stress characteristics. The ERM fluid means 54 is disposed within the interspacial chamber 22 between the first member 12, such as rotatable disc 16, and second member 14, such as housing 20. The ERM fluid typically includes a magnetizable particulate and a carrier vehicle for suspending the magnetizable particulate. The ERM fluid may also include a surfactant to keep the magnetizable particulate in suspension. The ERM fluid used in the present invention has a low shear resistance at zero magnetic field and a high shear resistance at a maximum applied magnetic field as is illustrated in FIG. 9. The ERM fluid means 54 of the present invention also exhibits low hysteresis, chemical inertness, temperature stability and a fast response time to changes in the applied magnetic field. Suitable ERM fluid means 54 is disclosed and described in U.S. Pat. Nos. 4,992,190 and 5,167,850 which are incorporated by reference herein. Additional characteristics and operating parameters of the ERM fluid means 54 can be obtained from SAE Technical Paper Series 930268, published Mar. 1, 1993, titled "Inactively Dampened Passenger Car Suspension System with Low Voltage Electro-Rheological Magnetic Fluid", and also from "Active Dampening Using ERM Fluids" an article in Automotive Engineering Magazine, dated June 1993, both of which are incorporated by reference herein. The ERM fluid means 54 disposed within the chamber 22 selectively changes shear stress characteristics in response to an applied magnetic field of controlled intensity. The ERM fluid means 54 requires a predefined variable amount of force to move one of the first and second members with respect to the other of the first and second members correlating to the intensity of the applied magnetic field.

Figure 6:
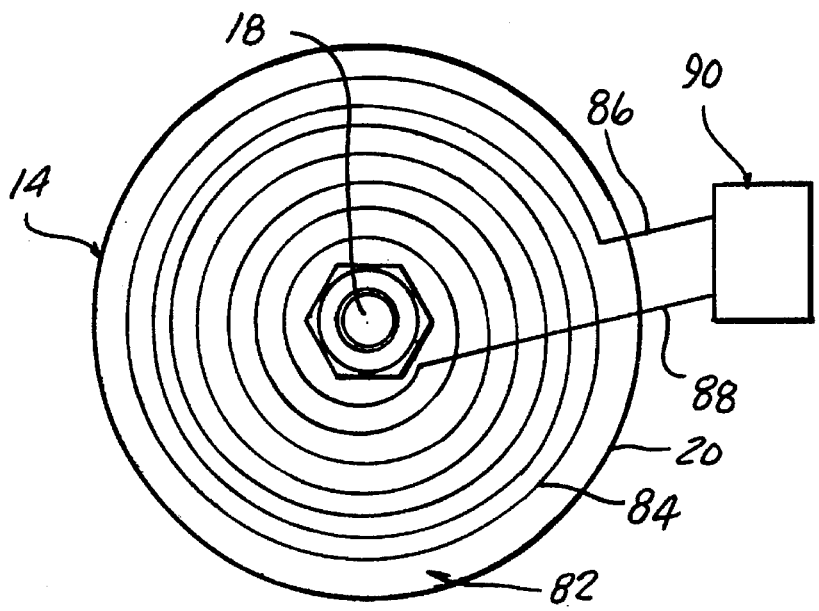
FIG. 6 is a simplified schematic view of a magnetic field inducing means disposed within a radially extending sidewall of a housing, wherein the magnetic field inducing means is a single spirally wound radially extending coil.
Figure 7:
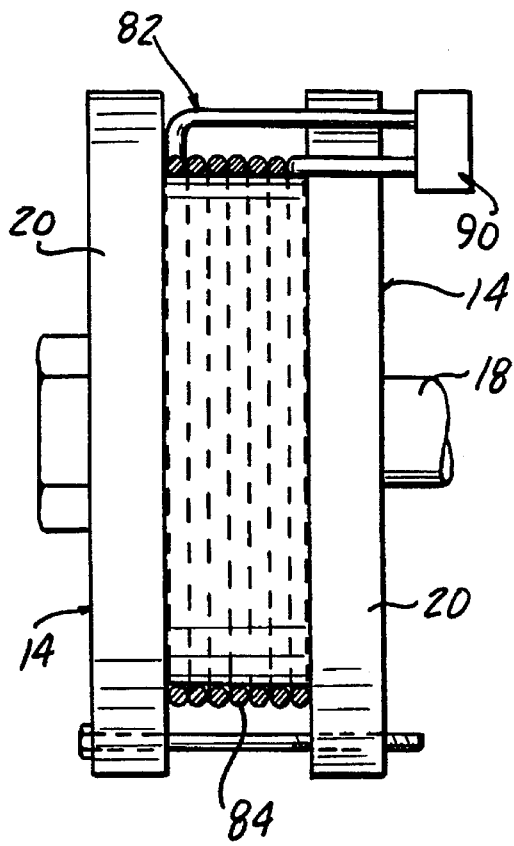
FIG. 7 is a simplified schematic view of a magnetic field inducing means, where the magnetic field inducing means is a helically wound coil disposed along a longitudinally extending sidewall of the housing enclosing a rotatable disc according to the present invention.

The force development system 10 according to the present invention also includes magnetic field inducing means 82 for selectively exposing the ERM fluid means 54 to a magnetic field of controlled intensity. In its simplest form, magnetic field inducing means 82 may include at least one coil 84 of electrically conductive wire supported by one of the first and second members, 12 and 14 respectively, in close proximity to the chamber 22. The coil 84 of conductive wire has first and second ends, 86 and 88 respectively, connectible to a controlled electrical power source 90. In simplified configurations, the coil 84 may be wound helically around an external surface of housing 20 extending longitudinally parallel with respect to the axis of rotation of the shaft 18 as illustrated in simplified schematic form in FIG. 7. In addition, or alternatively, coil 84 in a simplified form may be wound spirally to extend radially with respect to the axis of rotation of shaft 18 along a radially extending wall of the housing 20, e.g. or along both radially extending walls of the housing 20, e.g. on either side or on both sides of the rotatable disc 16, as illustrated schematically in FIG. 6.

Referring again to FIGS. 1–3, the magnetic field inducing means 82 preferably includes a plurality of coil assemblies 92. Each coil assembly 92 includes a bobbin 94 for receiving turns of the electrically conductive wire forming coil 84. In selecting the configuration of the bobbin 94, it is desirable to have a longitudinal length of the bobbin as short as possible while using as low a gauge of wire as possible to obtain as many turns as possible on each bobbin 94. A typical example, as illustrated in the preferred embodiment of FIGS. 1–3 and providing the operating characteristics as depicted in FIG. 9, would use 26 gauge wire with 350 turns per bobbin with 10 bobbins having longitudinal axis disposed equally angularly spaced about the rotational axis of the shaft 18 and connected to the external circumferential surface of the third, longitudinally extending, sidewall 28 of the housing 20, as best seen in FIG. 2. In this configuration, each bobbin is approximately 1¼ inch in diameter with annular flanges on each longitudinal end of approximately 1⅜ inch diameter and a longitudinal length of approximately ⅜ of an inch. The bobbins 94 can be made of any suitable material, such as plastics.

Preferably, the coil assemblies 92 are connected end to end in series for connection to a controlled electrical power source 90. It should be recognized that the coil assemblies 92 could be connected in parallel with one another if desired to achieve particular electrical operating characteristics. In the preferred embodiment illustrated in FIGS. 1–3, the force development system 10 according to the present invention can be operated on a 12 volt power source with approximately 7 to 8 ohm total resistance through the 350 turns of the 26 gauge wire on each of 10 bobbins connected in series with one another. As illustrated, it is desirable to position the magnetic field inducing coil assemblies 92 in close proximity to the outer radial end 30 of the rotatable disc 16 in order to achieve the maximum force moment arm to take best advantage of the changing shear stress characteristics of the ERM fluid means 54 in response to the changing magnetic field strength or intensity. As illustrated, the diameter of each bobbin 94 is approximately equal to the longitudinal width of the rotatable disc 16. Of course, it should be recognized that the longitudinal width of the rotatable disc 16 could be enlarged to provide a greater wetted surface area on the outer radial end 30 of the rotatable disc 16, and that larger diameter bobbins 94 could be provided for use in producing the coil assemblies 92 for such a configuration, or multiple smaller diameter bobbins 94 could be used in the coil assemblies 92 and staggered along the longitudinal length of the housing with respect to the longitudinal width of the outer radial end 30 of the rotatable disc 16 or the bobbins could be placed in longitudinally spaced annular rings.

Each coil assembly 92 is connected to the housing 20. For the preferred configuration illustrated in FIGS. 1–3, each coil assembly 92 is disposed within an enclosure 93, preferably of magnetizable material such as steel, with a central pin 95 extending through the central aperture 100 or central portion of the coil 84 or bobbin 94 to define an armature to focus magnetic field lines of force through the electromagnetic fluid within the chamber when the enclosure is connected to the housing. The coil assembly 92 is connected by suitable fastener means 96, such as non-magnetic threaded screws 98, extending through threaded apertures 102 in the sidewalls 24, 26 of the housing 20 to engage the housing 93 on both sides to hold the enclosure 93 in place with respect to housing 20. Of course, it should be recognized that any suitable fastening means may be employed.

Figure 4:
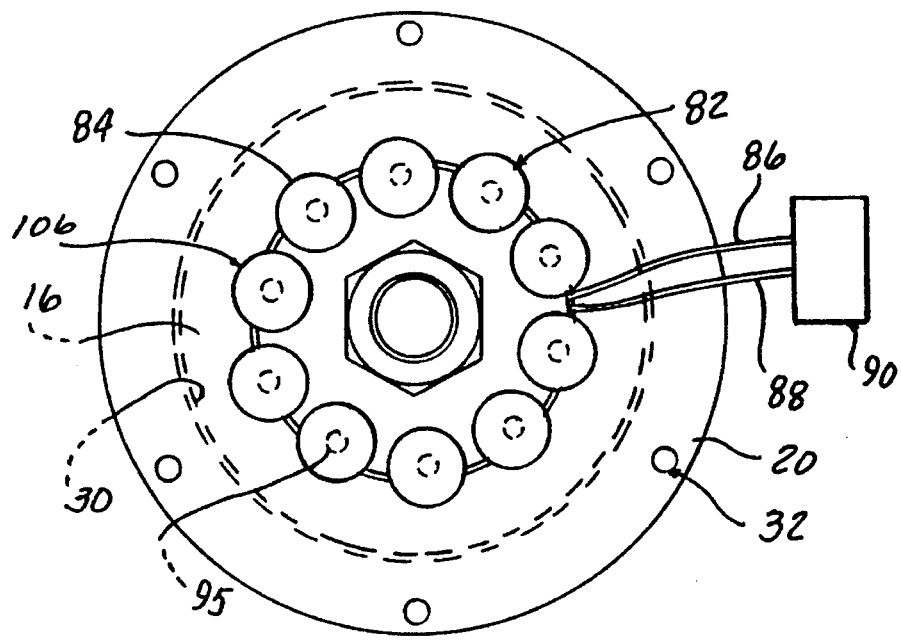
FIG. 4 is a side elevational view of a magnetic field inducing means disposed in a radially extending sidewall of a housing enclosing a moveable member according to the present invention.
Figure 5:
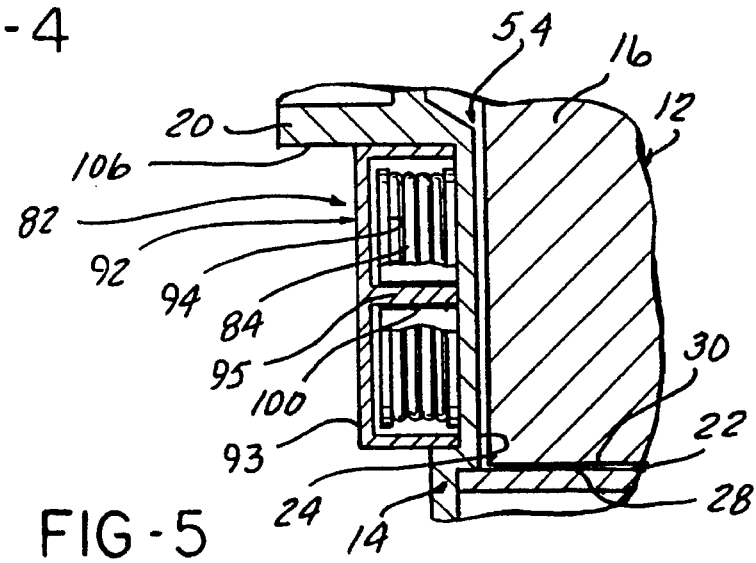
FIG. 5 is a detailed view of a magnetic field inducing means connected to a radially extending sidewall of a housing according to the present invention as illustrated in FIG. 4.

Referring now to FIGS. 4 and 5, in addition or alternatively, the magnetic field inducing means 82 can include a plurality of coil assemblies 92 having longitudinal axes parallel to the rotational axis of the shaft 18 and parallel to one another. The coil assemblies 92 are connected to the radially extending sidewall of the housing 20, and preferably are disposed at equally angularly spaced positions about the rotational axis of shaft 18. Each coil assembly 92 connected to the radially extending sidewall of the housing 20 can be of the same structural configuration as the coil assemblies connected to the longitudinally extending sidewall of the housing 20. Depending on the physical configuration of the rotating disc 16 and shaft 18, the coil assemblies 92 connected to the radially extending sidewall of the housing 20 may be larger, smaller or the same size as the coil assemblies 92 connected to the longitudinally extending sidewall of the housing 20. The coil assemblies 92 preferably include a bobbin 94 having a coil 84 of electrically conductive wire turned about the bobbin 94 and having first and second ends, 86 and 88. The coil assemblies 92 are electrically connected to one another and are connectible to a controlled electrical power source 90. The coil assemblies 92 connected to the radially extending sidewall of the housing 20 may be connected to the same controlled electrical power source, or a separate controlled electrical power source 90 from that controlling coil assemblies 92 connected to the longitudinally extending sidewall of the housing 20 when used in combination with one another. The coil assemblies 92 connected to the radially extending sidewall of the housing 20 may be connected in series with the coil assemblies 92 connected to the longitudinally extending sidewall of the housing 20 for subsequent connection to the controlled electrical power source 90. Of course, if the rotatable disc 16 is of a large diameter relative to the diameter of the bobbin 94, it may be possible to provide additional coil assemblies 92 connected to the radially extending sidewall of the housing 20 by staggering the coil assemblies 92 at varying radial distances from the rotational axis of the shaft 18 to provide concentric circles of coil assemblies 92 connected either in series or parallel with one another. It is desirable in selecting the location for the coil assemblies 92 to be connected to the radially extending sidewall of the housing 20 to choose locations which are at a maximum permissible radial distance from the rotational axis of the shaft 18 so that the effective magnetic field strength lines lie adjacent to the outer radial end 30 of the rotatable disc 16, since this provides the maximum moment arm for forces generated by the change in shear stress characteristics of the ERM fluid means 54. A longitudinally extending aperture 106 may be formed in the radially extending sidewall of the housing 20 adapted to receive the coil assembly 92 as best seen in FIG. 5. The longitudinally extending apertures 106, as illustrated in FIG. 5, open to the external surface of the radially extending sidewall of the housing. The coil assembly 92 is connected to the housing 20 by fastener means 96 (not shown in FIG. 5), such as a threaded screw 98 extending through a threaded aperture 102 in the sidewall of the housing 20 for connection to the enclosure 93, to hold the enclosure 93 in place with respect to the aperture 106 in the housing 20. The coil assemblies 92 may be connected to one or both radially extending sidewalls of the housing 20 depending on the operating characteristics desired for the force development system 10 according to the present invention.

Figure 10:
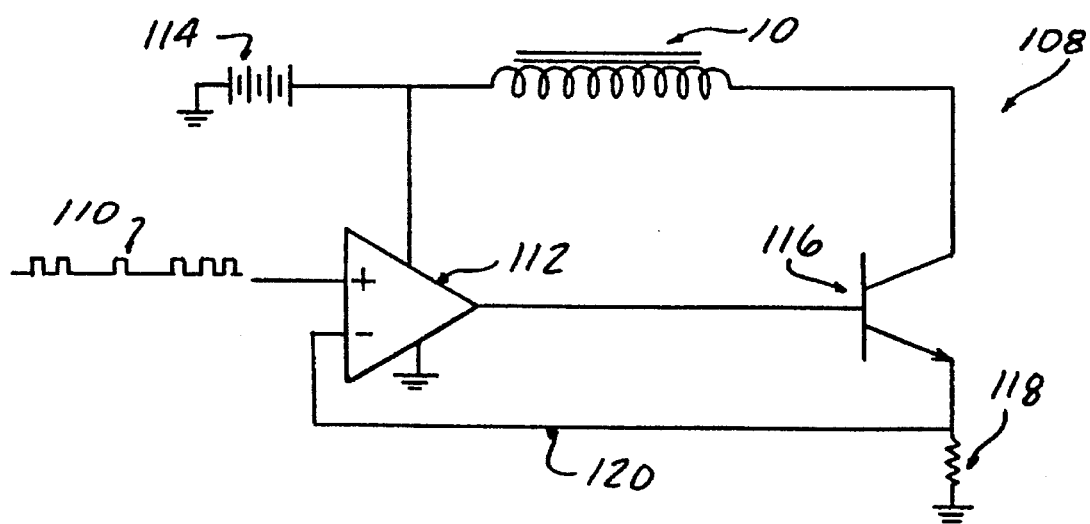
FIG. 10 is a simplified schematic view of an electrical control circuit for controlling the intensity of the magnetic field induced within an electrically conductive wire for selectively changing shear stress characteristics of the electro-rheological magnetic fluid means according to the present invention.

Referring now to FIG. 10, a simple control circuit is schematically illustrated for providing the controlled electrical power source 90 to the force development system 10 according to the present invention. Of course, the simple control circuit could be driven by a pulse width modulated wave form 110 as shown, or could be driven by a controlled d.c. voltage (not shown). In the simple control circuit 108, a pulse width modulated, frequency modulated or ramped, control signal 110 is fed to an operational amplifier 112 which is powered by a 12 volt power source 114, such as an alternating current transformer. The 12 volt power source is also applied to the force development system 10 which is connected to ground through a transistor 116 and resistor 118. A feedback loop 120 is taken off between the transistor 116 and resistor 118 for a feedback loop to the operational amplifier 112. The operational amplifier 112 controls the state of the transistor 116 between an energized and deenergized state, or open and closed state connecting the force development system 10 according to the present invention to ground when energized or closed through resistor 18 in response to the control signal 110. By suitable manipulation of the control signal 110, the affective magnetic field strength of the coils 84 can be controlled as desired to develop the desired torque resistance to movement of one of the first and second members, 12 and 14 respectively, with respect to the other.

Figure 8:
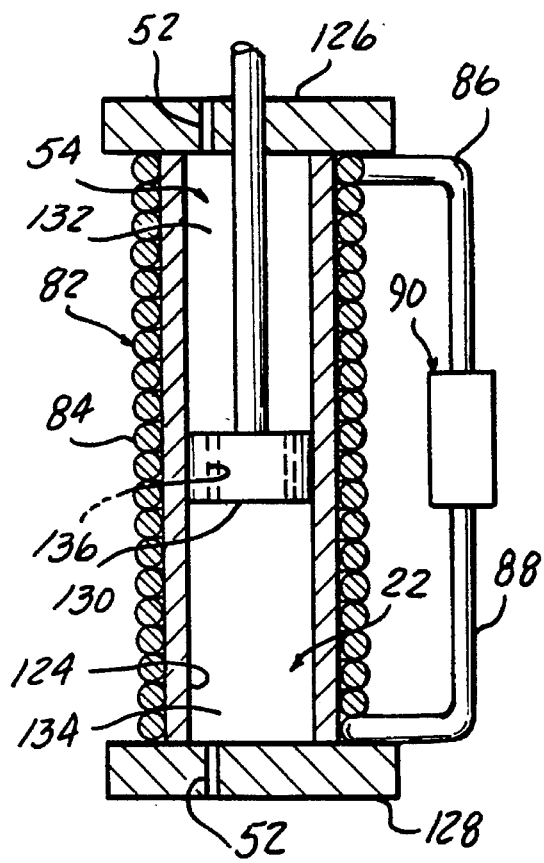
FIG. 8 is a simplified schematic view of the present invention where the first member is a moveable piston disposed within a housing to define an interspacial chamber therebetween, where the magnetic field inducing means is a coil wound helically around the longitudinally extending sidewall of the cylindrical housing enclosing the piston.

In an alternative configuration, as illustrated in FIG. 8, the first and second members, 12 and 14 respectively, may include an elongated housing 124 having first and second ends, 126 and 128 respectively, and a piston 130 disposed within the elongated housing 124 defining first and second portions, 132 and 134 respectively, of the interspacial chamber 22 defined between the first and second members, 12 and 14 respectively. The first and second portions, 132 and 134 respectively, of the interspacial chamber 22 in communication with one another through at least one aperture 136 formed through the piston 130. The interspacial chamber 22 being filled with ERM fluid means 54. Magnetic field inducing means 82 for this configuration may take the form of a coil 84 having first and second ends, 86 and 88 respectively, for connection to a controlled electrical power source 90. The coil 84 may be helically wound around the outer circumferential surface of the elongated housing 124. Normally closed, fluid entry means 52 as provided for filling the interspacial chamber 22 with the ERM fluid means 54.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A force development system for controlling and generating variable shear forces in an exercise machine to strengthen and develop body muscles comprising:

first and second members moveable with respect to one another and defining an interspacial chamber therebetween, at least one of said first and second members moveable with respect to a first axis and operably connectible to said exercise machine;

electro-rheological magnetic fluid means disposed within the chamber for selectively changing shear stress characteristics and for requiring a corresponding amount of force to move one of said first and second members with respect to the other of said first and second members, the electro-rheological magnetic fluid including a magnetizable particulate suspended in a liquid carrier vehicle; and magnetic field inducing means for selectively exposing said electro-rheological magnetic fluid means to a magnetic field of controlled intensity, said magnetic field inducing means including at least one coil of electrically conductive wire supported with respect to said first axis along a radially extending portion of one of said first and second members.

2. The system of claim 1 wherein said first and second members further comprise:

a rotatable disc secured to and carried on a shaft having an axis of rotation; and a housing enclosing said disc and supporting said shaft and disc for rotation, said housing and disc spaced slightly longitudinally and radially from one another to define said chamber.

3. The system of claim 2 wherein said shaft has at least one end extending outwardly from said housing for operable connection to said exercise machine.

4. The system of claim 1 wherein said first and second members further comprises:

an elongated, longitudinally extending, housing having first and second ends;

a piston disposed within said housing for longitudinal reciprocation therein and having at least one aperture formed therethrough defining a passage communicating between first and second chambers adjacent said first and second ends of said housing respectively.

5. The system of claim 1 wherein said electro-rheological magnetic fluid means further comprises:

a fluid responsive to a magnetic field capable of operating on low voltage to generate changes in shear stress characteristics.

6. The system of claim 5 wherein said fluid further comprises:

a low shear resistance at zero magnetic field, a high shear resistance at a maximum applied magnetic field, low hysteresis, chemical inertness, temperature stability and fast response time.

7. The system of claim 1 wherein said magnetic field inducing means further comprises:

said at least one coil of electrically conductive wire supported by one of said first and second members in close proximity to said chamber, said coil of wire having first and second ends connectible to a controlled electrical power source.

8. The system of claim 7 wherein said coil of wire extends spiralling radially outwardly from a central point.

9. The system of claim 7 wherein said coil of wire extends helically along a longitudinal axis.

10. The system of claim 1 wherein said magnetic field inducing means further comprises:

a plurality of coils of electrically conductive wire electrically connected together and supported by one of said first and second members in close proximity to said chamber, said plurality of coils connectible to a controlled electrical power source.

11. The system of claim 10 wherein said plurality of coils are connected in series.

12. The system of claim 10 wherein said plurality of coils are connected in parallel.

13. The system of claim 10 wherein said plurality of coils of wire are disposed having coil axes extending radially inwardly toward a common central axis.

14. The system of claim 10 wherein said plurality of coils of wire are disposed having coil axes extending parallel with respect to one another.

15. A force development system for controlling and generating variable forces in an exercise machine to strengthen and develop body muscles comprising:

an elongated shaft having a longitudinal axis of rotation and connectible to the exercise machine;

a disc connected to the shaft for rotation therewith;

a housing enclosing the disc and supporting the shaft for rotation with respect to the housing, the housing having first and second side walls extending radially and spaced longitudinally from longitudinal sides of said disc, the first and second side walls connected to one another by a third side wall extending longitudinally and spaced radially from an outer radial end of said disc, the housing spaced from the disc defining a chamber therebetween;

an electro-rheological magnetic fluid within the chamber for selectively changing shear stress characteristics in response to an applied magnetic field, thereby providing a controllable variable torque resistance to rotation of the disc with respect to the housing through the shaft corresponding to the applied magnetic field; and magnetic field inducing means for selectively exposing said electro-rheological magnetic fluid to a magnetic field of controlled intensity, the magnetic field inducing means including at least one coil of electrically conductive wire supported with respect to the longitudinal axis of the shaft along a radially extending portion of at least one of the first and second side walls of the housing.

16. The system of claim 15 wherein said magnetic field inducing means further comprises:

a plurality of coils having longitudinal axes extending radially with respect to said rotational axis of said disc.

17. The system of claim 15 wherein said magnetic field inducing means further comprises:

a plurality of coils of electrically conductive wire electrically connected together and supported by at least one of said first and second side walls in close proximity to said chamber, said plurality of coils connectible to a controlled electrical power source.

18. A force development system for controlling and generating variable forces in an exercise machine to strengthen and develop body muscles comprising:

an elongated shaft having a longitudinal axis of rotation and connectible to said exercise machine;

a disc connected to the shaft for rotation therewith;

a housing enclosing the disc and supporting the shaft for rotation with respect to the housing, the housing having first and second side walls extending radially and spaced longitudinally from longitudinal sides of said disc, the first and second side walls connected to one another by a third side wall extending longitudinally and spaced radially from an outer radial end of said disc, the housing spaced from the disc defining a chamber therebetween;

an electro-rheological magnetic fluid within the chamber for selectively changing shear stress characteristics in response to an applied magnetic field, thereby providing a controllable variable torque resistance to rotation of the disc with respect to the housing through the shaft corresponding to the applied magnetic field; and magnetic field inducing means for selectively exposing said electro-rheological magnetic fluid to a magnetic field of controlled intensity, wherein said magnetic field inducing means includes a plurality of coils of electrically conductive wire electrically connected together and supported by said first and second side walls in close proximity to said chamber, said plurality of coils connectible to a controlled electrical power source, each of said coils assembled to a bobbin and disposed within an enclosure of magnetizable material, said enclosure including a pin extending axially through said coils to define an armature to focus magnetic field lines of force through said electro-magnetic fluid within said chamber when said enclosure is connected to said housing.

19. The system of claim 18 further comprising:

said coils connected to said third wall of said housing at equally spaced angular positions with respect to a rotational axis of said shaft.

20. The system of claim 18 further comprising:

said coils connected to said first and second walls of said housing at radially and equally angularly spaced locations with longitudinal coil axes extending parallel to one another and parallel to a rotational axis of said shaft.

* * * * *